(12) United States Patent
Anderson

(10) Patent No.: US 12,089,600 B2
(45) Date of Patent: Sep. 17, 2024

(54) EDIBLE CONE PRODUCTION ASSEMBLY

(71) Applicant: Carroll Anderson, Quincy, MA (US)

(72) Inventor: Carroll Anderson, Quincy, MA (US)

( * ) Notice: Subject to any disclaimer, the term of this patent is extended or adjusted under 35 U.S.C. 154(b) by 749 days.

(21) Appl. No.: 17/361,278

(22) Filed: Jun. 28, 2021

(65) Prior Publication Data

US 2022/0408736 A1 Dec. 29, 2022

(51) Int. Cl.
| | | |
|---|---|---|
| *A21C 15/02* | (2006.01) | |
| *A21B 1/48* | (2006.01) | |
| *A21B 3/18* | (2006.01) | |
| *A21B 5/02* | (2006.01) | |
| *A21C 5/00* | (2006.01) | |
| *A21D 13/33* | (2017.01) | |

(52) U.S. Cl.
CPC .............. *A21C 15/025* (2013.01); *A21B 1/48* (2013.01); *A21B 3/18* (2013.01); *A21B 5/026* (2013.01); *A21C 5/006* (2013.01); *A21D 13/33* (2017.01)

(58) Field of Classification Search
CPC .. A21B 5/026; A21B 1/48; A21B 3/18; A21B 5/02; A21C 15/025; A21C 11/00; A21C 15/00; A21C 3/06; A21C 5/006; A21C 9/063; A21C 9/088; A21D 13/33; A21D 13/31; A21D 13/41
USPC ........... 425/319; 426/500; 99/353, 404, 427, 99/407, 443 C, 450.2, 450.1, 485, 349, 99/354, 355, 383, 395, 423, 428, 442, 99/448, 455, 489, 537
See application file for complete search history.

(56) References Cited

U.S. PATENT DOCUMENTS

| | | | |
|---|---|---|---|
| 2,255,506 A | | 9/1941 | Frediani |
| 3,766,846 A | * | 10/1973 | Jimenez ............... A47J 37/1214 99/427 |
| 4,038,007 A | * | 7/1977 | Griner .................... A21B 5/026 425/432 |
| 4,038,016 A | | 7/1977 | Griner |
| 5,298,273 A | * | 3/1994 | Ito ........................ B65D 65/463 426/138 |
| 6,824,799 B1 | | 11/2004 | Huang |
| 2004/0187708 A1 | * | 9/2004 | Waldstrom ............. A23G 9/506 99/455 |
| 2006/0078652 A1 | | 4/2006 | Phillips |
| 2008/0248169 A1 | | 10/2008 | Amend |
| 2010/0297314 A1 | | 11/2010 | Bogal |
| 2017/0135385 A1 | | 5/2017 | Bartkowski |

FOREIGN PATENT DOCUMENTS

WO WO2008122486 10/2008

\* cited by examiner

*Primary Examiner* — Vy T Nguyen

(57) ABSTRACT

An edible cone production assembly for streamlined production of edible cones includes a conveyor, which comprises a pair of belts. A platform is engaged to and extends between the belts. A sheet, which is resiliently flexible, is engaged to the platform. A hopper, which is engaged to the conveyor, contains a batter, and portions the batter onto the sheet. A heating unit substantially encompasses a section of the conveyor between the first end and a second end of the conveyor. A guide is engaged to the conveyor within the heating unit and is positioned to selectively engage a plurality of forming units engaged to the platform as it traverses the heating unit to mold the batter into a cone as the heating unit bakes the batter. The cone drops from the platform as the platform rounds an end of the conveyor. The platform is one of a plurality of platforms.

15 Claims, 10 Drawing Sheets

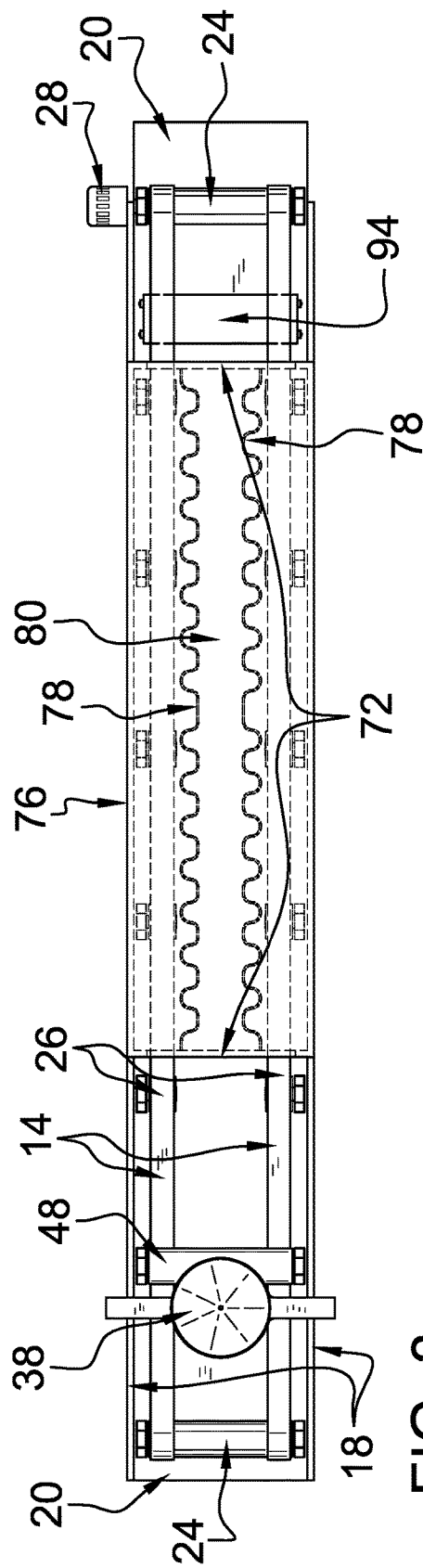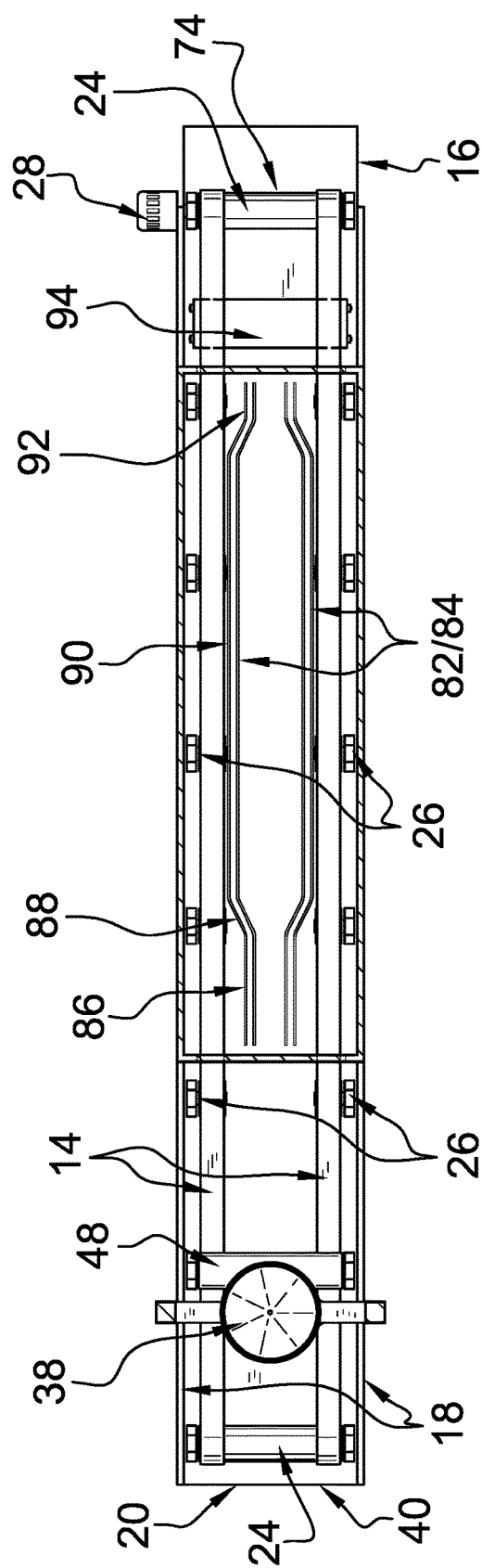

EDIBLE CONE PRODUCTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to production assemblies and more particularly pertains to a new production assembly for streamlined production of edible cones. The present invention discloses a production assembly comprising a flexible sheet that is acted upon by forming units so that the sheet reversibly assumes a conical shape to mold batter for the production of cones.

(2) Description of Related Art Including Information Disclosed Under 37 CFR 1.97 and 1.98

The prior art relates to production assemblies, which may comprise rigid two-part molds. What is lacking in the prior art is a production assembly comprising a flexible sheet that is acted upon by forming units so that the sheet reversibly assumes a conical shape to mold batter for the production of cones.

BRIEF SUMMARY OF THE INVENTION

An embodiment of the disclosure meets the needs presented above by generally comprising a conveyor, which comprises a pair of belts. A platform is engaged to and extends between the belts so that the platform rotates concurrently with the belts. A sheet, which is resiliently flexible, has a centerline that is engaged to the platform. A hopper is engaged to the conveyor proximate to a first end of the conveyor and is stationary relative to the belts. The hopper is configured to contain a batter and to portion the batter onto the sheet as the platform passes under the hopper. A plurality of forming units is rotationally engaged to the platform. A heating unit substantially encompasses a section of the conveyor between the first end and a second end of the conveyor. A guide is engaged to the conveyor within the heating unit and is positioned to selectively engage the forming units as the platform traverses the heating unit. The forming units are configured to mold the batter into a cone as the heating unit bakes the batter and to release the cone as the platform exits the heating unit. The cone drops from the platform as the platform rounds the second end of the conveyor. The platform is one of a plurality of platforms.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a top view of an embodiment of the disclosure.

FIG. 4 is a cross-sectional view of an embodiment of the disclosure.

DETAILED DESCRIPTION OF THE INVENTION

Figure 1:
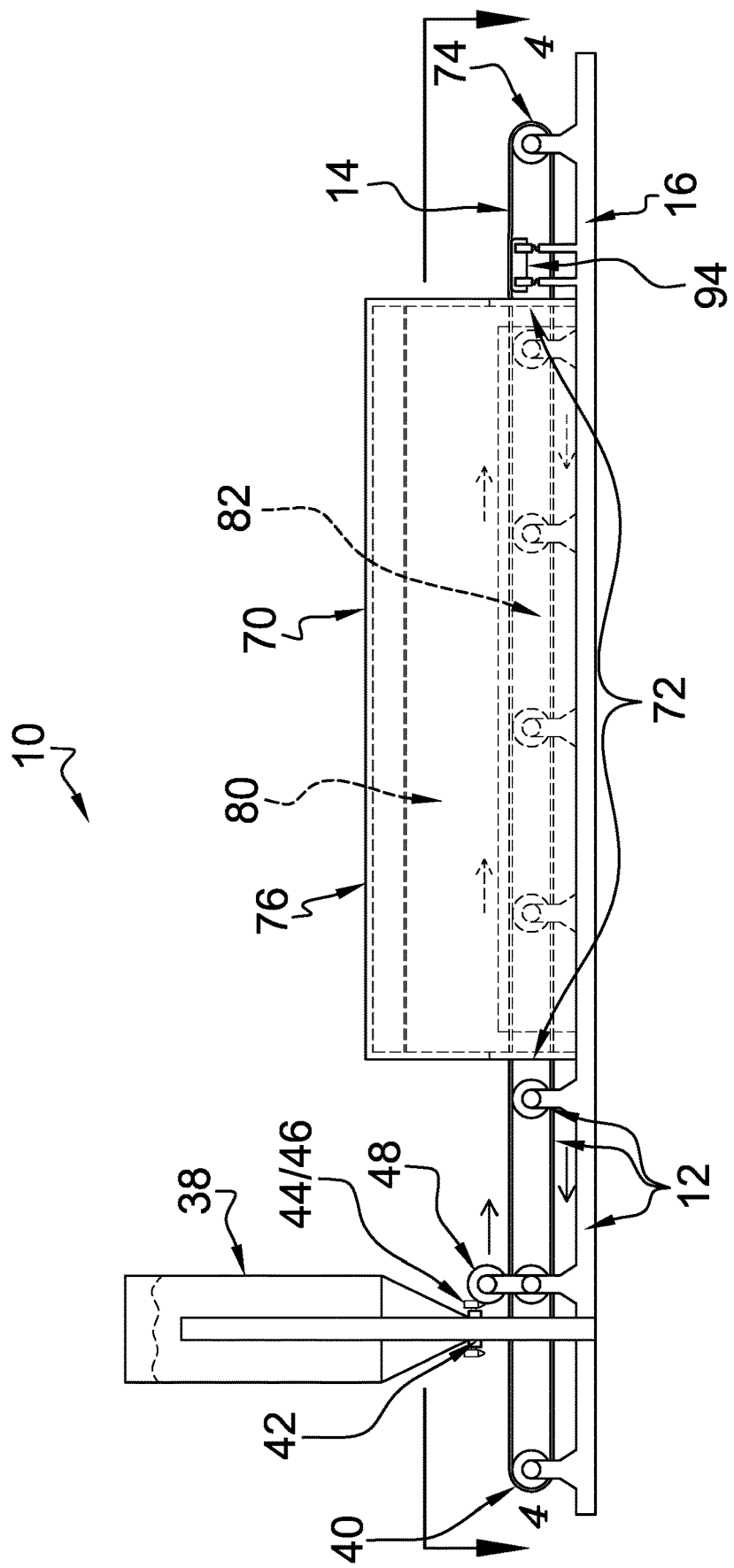
FIG. 1 is a side view of an edible cone production assembly according to an embodiment of the disclosure.

With reference now to the drawings, and in particular to FIGS. 1 through 11 thereof, a new production assembly embodying the principles and concepts of an embodiment of the disclosure and generally designated by the reference numeral 10 will be described.

As best illustrated in FIGS. 1 through 11, the edible cone production assembly 10 generally comprises a conveyor 12, which in turn comprises a pair of belts 14. The conveyor 12 comprises a frame 16, which in turn comprises a pair of siderails 18 and a pair of end rails 20 so that the frame 16 is elongated rectangularly shaped. A plurality of arms 22 is engaged to and extends upwardly from the siderails 18. Each of a pair of end rollers 24 is engaged to and extends between a pair of arms 22 that is engaged singly to the siderails 18 and positioned proximate to a respective end rail 20, so that the end roller 24 is rotationally engaged to the pair of belts 14. Each of a plurality of medial rollers 26 is engaged to a respective arm 22 so that the medial roller 26 is rotationally engaged to an associated belt 14. A motor 28 is operationally engaged to a respective end roller 24 and is positioned to selectively rotate the respective end roller 24 to rotate the pair of belts 14.

A platform 30 is engaged to and extends between the belts 14 so that the platform 30 rotates concurrently with the belts 14. A set of legs 32 is engaged to and is positioned between the platform 30 and the belts 14 so that the platform 30 is offset from the belts 14.

A sheet 34, which is resiliently flexible, has a centerline 36 that is engaged to the platform 30. The sheet 34 may comprise silicone, elastomer, or the like. The sheet 34 may be substantially triangularly shaped. As will become apparent, the sheet 34 being substantially triangularly shaped leads to production of a conically shaped cone for serving ice cream, gelato, and the like. The present invention anticipates the sheet 34 being alternately shaped and leading to cones of other shapes. Additionally, the sheet 34 shown in FIG. 3 is substantially flat. The present invention also anticipates the sheet 34 being textured, such as waffled, leading to cones that are complementarily textured.

Figure 2:
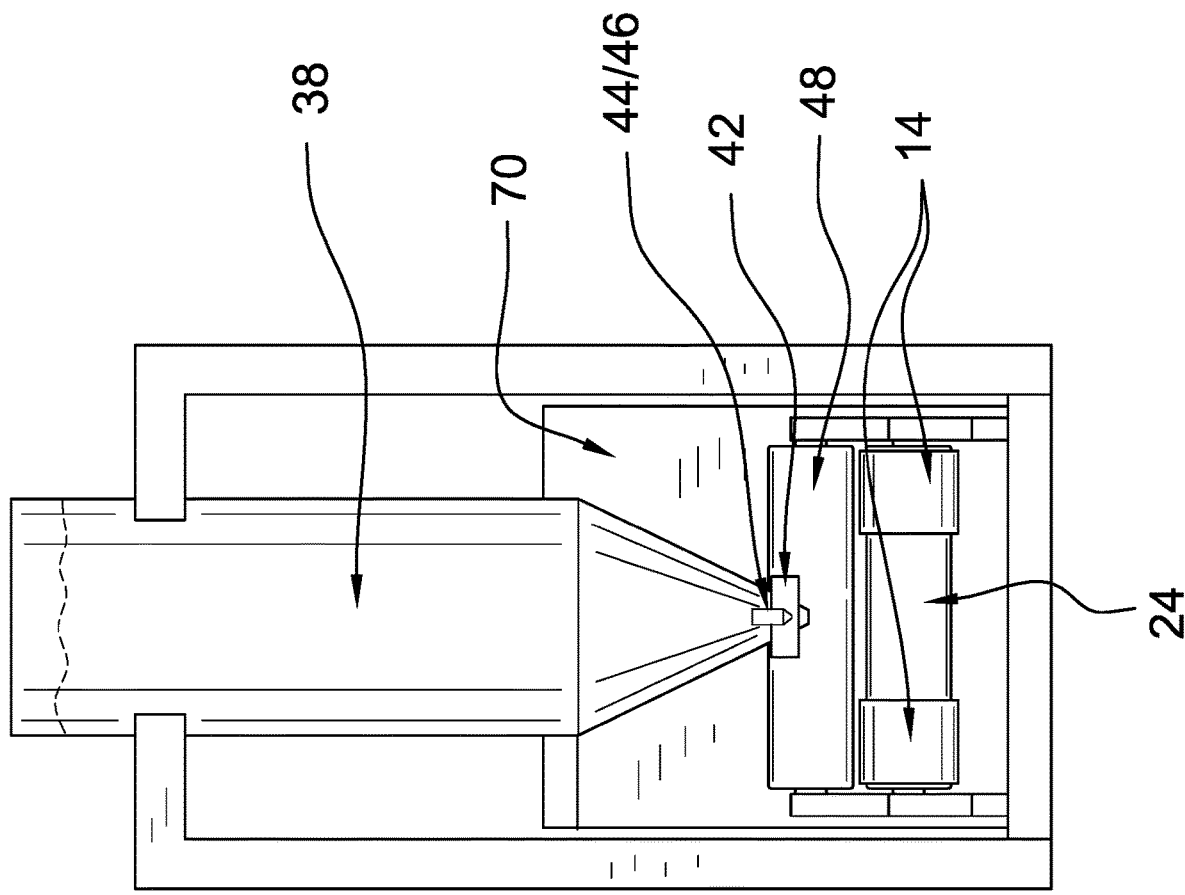
FIG. 2 is an end view of an embodiment of the disclosure.

A hopper 38 is engaged to the conveyor 12 proximate to a first end 40 of the conveyor 12 and is stationary relative to the belts 14. The hopper 38 is configured to contain a batter and to portion the batter onto the sheet 34 as the platform 30 passes under the hopper 38. A valve 42 is operationally engaged to the hopper 38 and is positioned to dispense the batter selectively and quantitatively from the hopper 38 onto the sheet 34. A sensor 44 is engaged to the hopper 38 proximate to the valve 42 and is operationally engaged to the valve 42. The sensor 44 is configured to assess a position of the sheet 34 and is positioned to signal the valve 42 when the sheet 34 is positioned to receive the batter. The sensor 44 may comprise a laser 46, as shown in FIG. 2, of other position sensing means, such as, but not limited to, capacitive displacement sensors, laser Doppler vibrometers, and the like.

A rim 96 is engaged to and extends substantially perpendicularly from a perimeter 98 of the sheet 34. The rim 96 is configured to retain the batter on the sheet 34. A cylinder 48 is rotationally engaged to the conveyor 12 proximate to the hopper 38 and is configured to level the batter on the sheet 34 as the platform 30 passes under the cylinder 48 with the cylinder 48 rolling over the rim 96.

Figure 9:
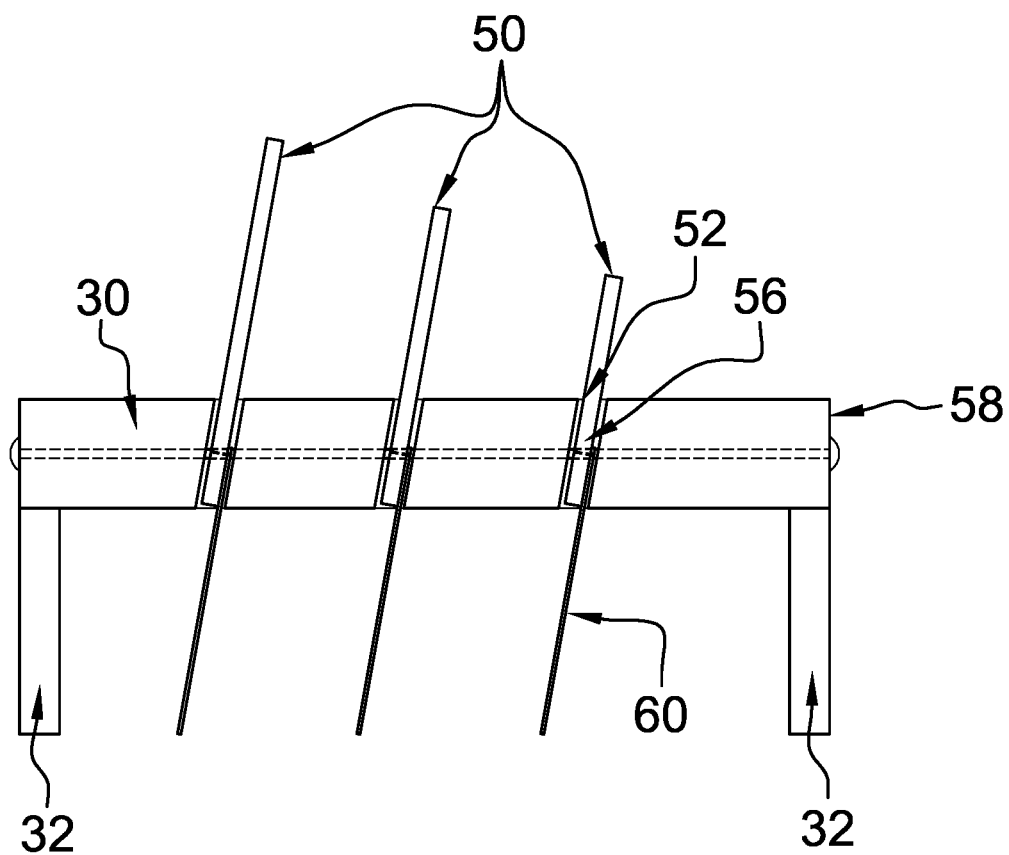
FIG. 9 is a detail side view of an embodiment of the disclosure.
Figure 10:
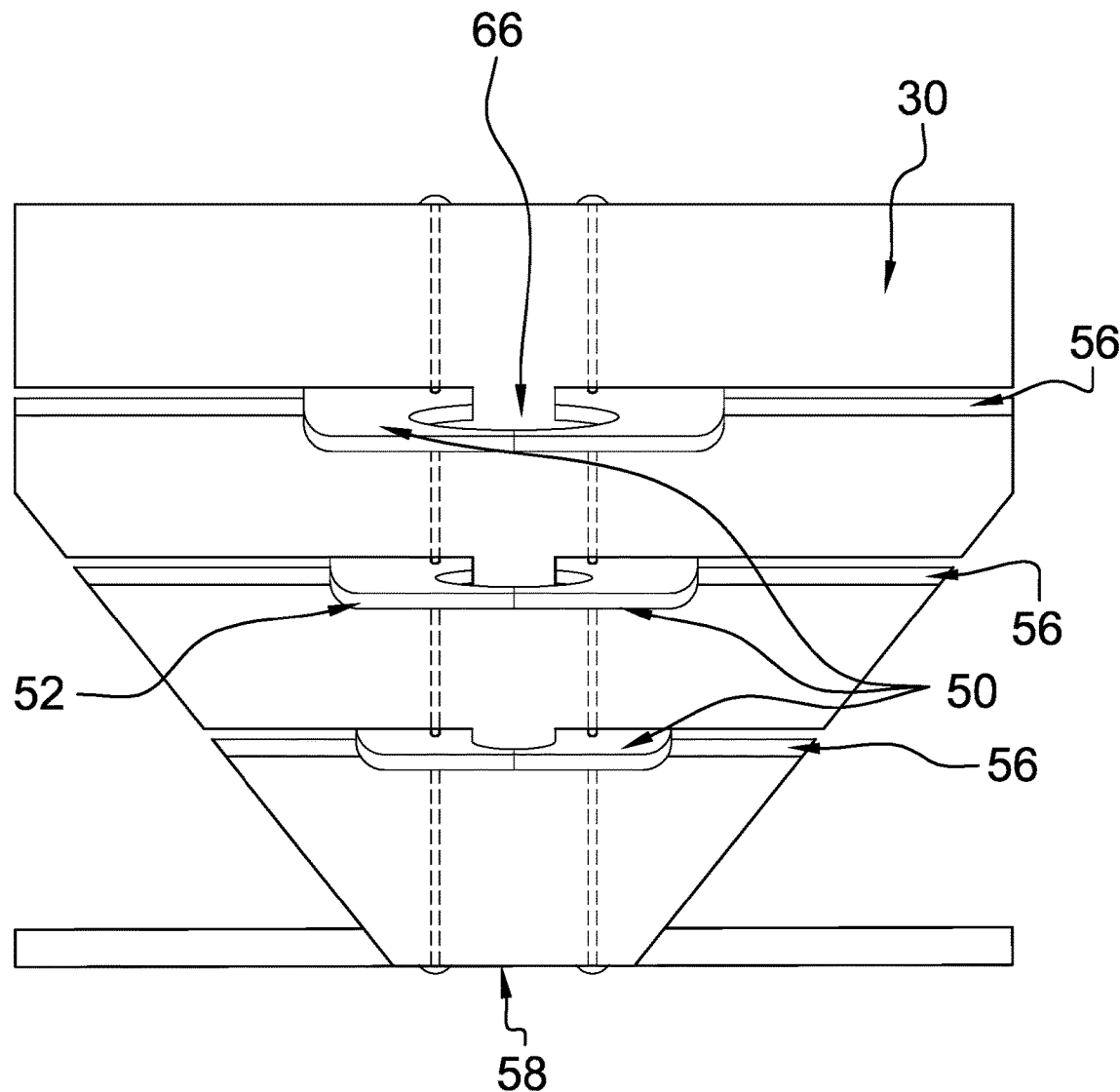
FIG. 10 is a detail top view of an embodiment of the disclosure.
Figure 11:
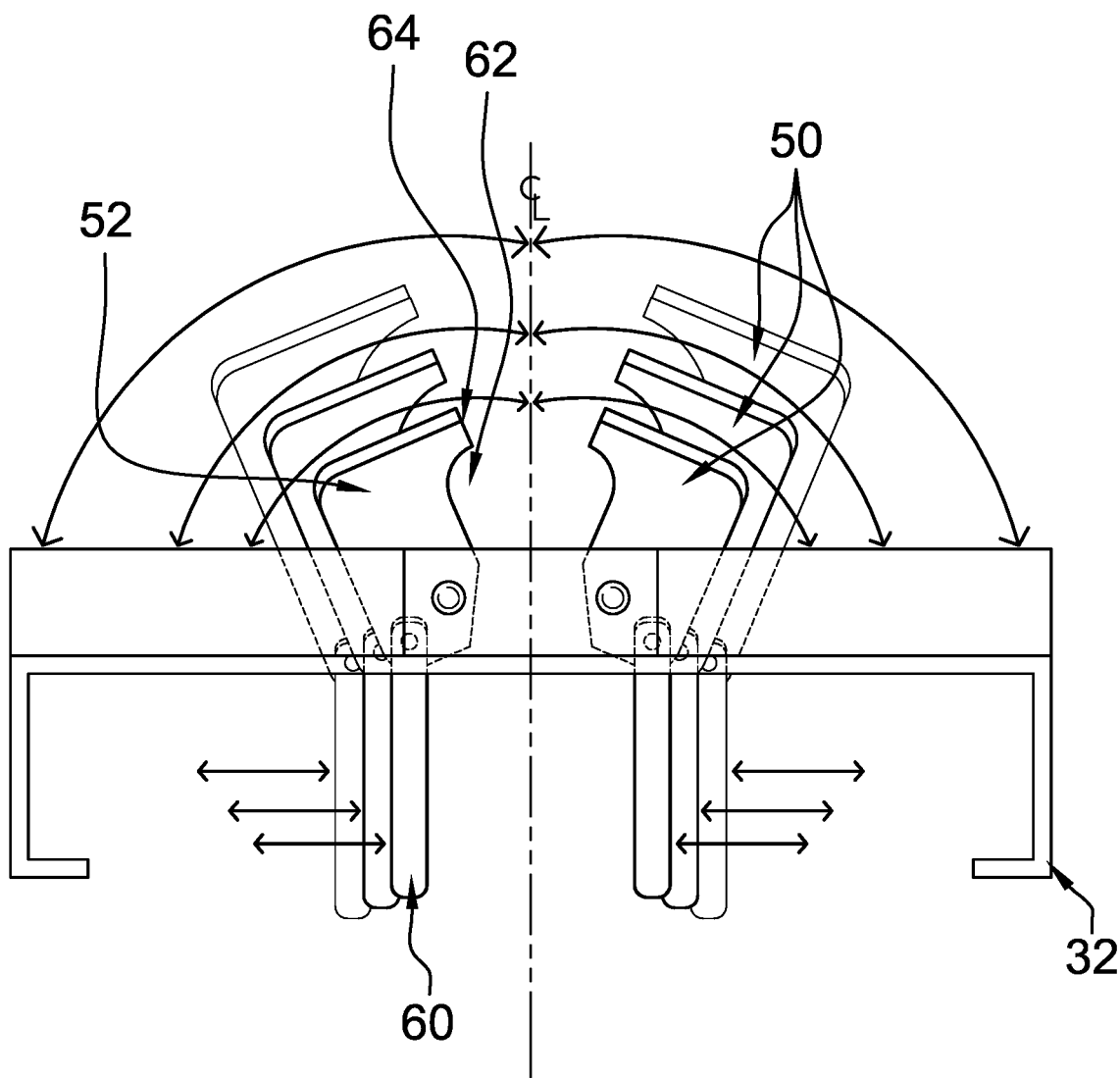
FIG. 11 is a detail in-use view of an embodiment of the disclosure.

A plurality of forming units 50 is rotationally engaged to the platform 30. Each forming unit 50 comprises a panel 52, which has a first edge 54 that is rotationally engaged to the platform 30. The panel 52 has a default position wherein the panel 52 is substantially positioned in an associated slot 56 that is positioned in the platform 30, as shown in FIG. 11. The slot 56 is angled within the platform 30 so that the panel 52 is tilted toward a forward edge 58 of the platform 30 when the panel 52 is in an extended configuration. The angling of the slot 56 and tilting of the panel 52 is shown in FIG. 9. A tang 60 is operationally engaged to the panel 52 proximate to the first edge 54 so that the tang 60 extends from the panel 52 through the slot 56.

Figure 5:
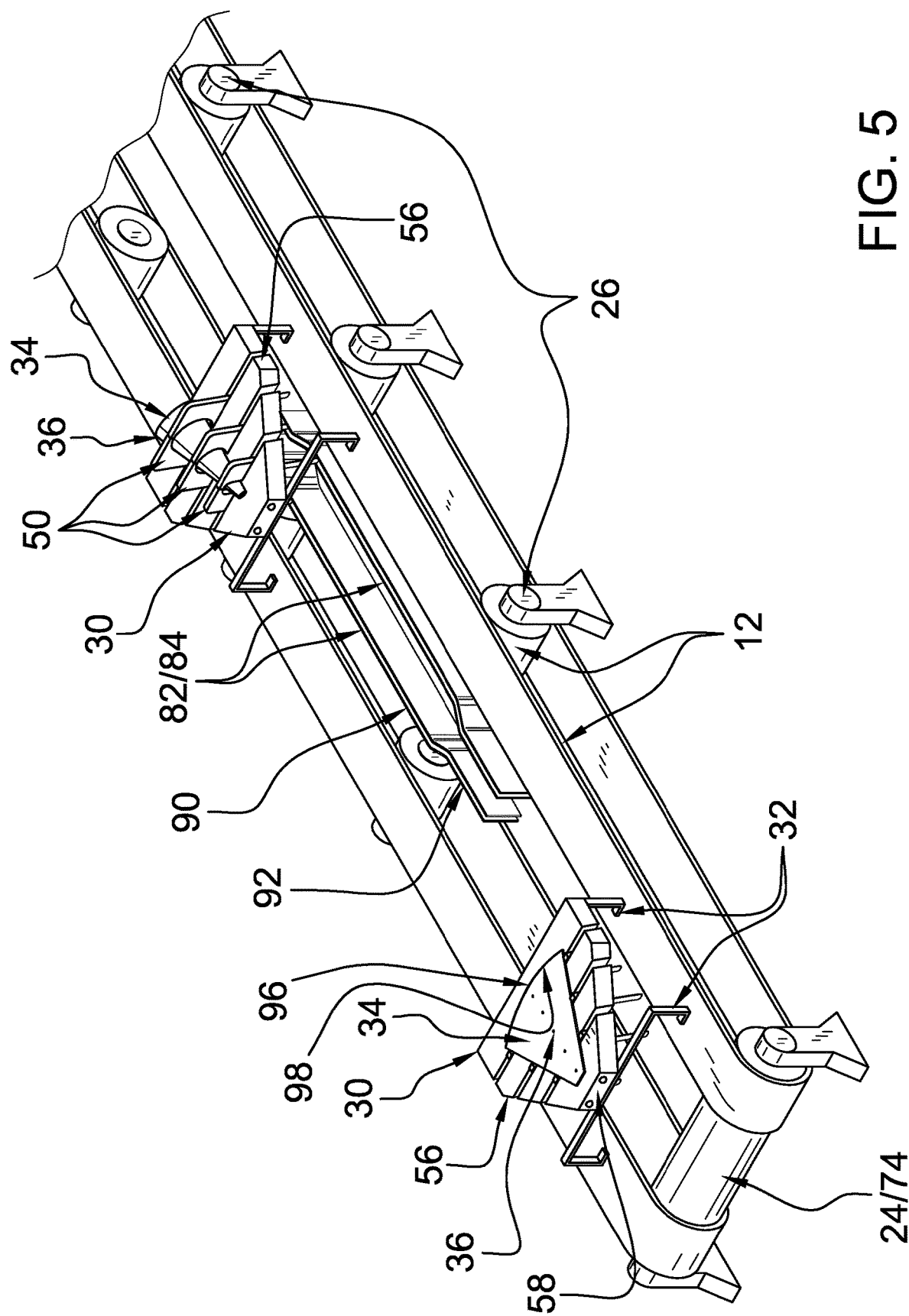
FIG. 5 is a detail isometric perspective view of an embodiment of the disclosure.
Figure 6:
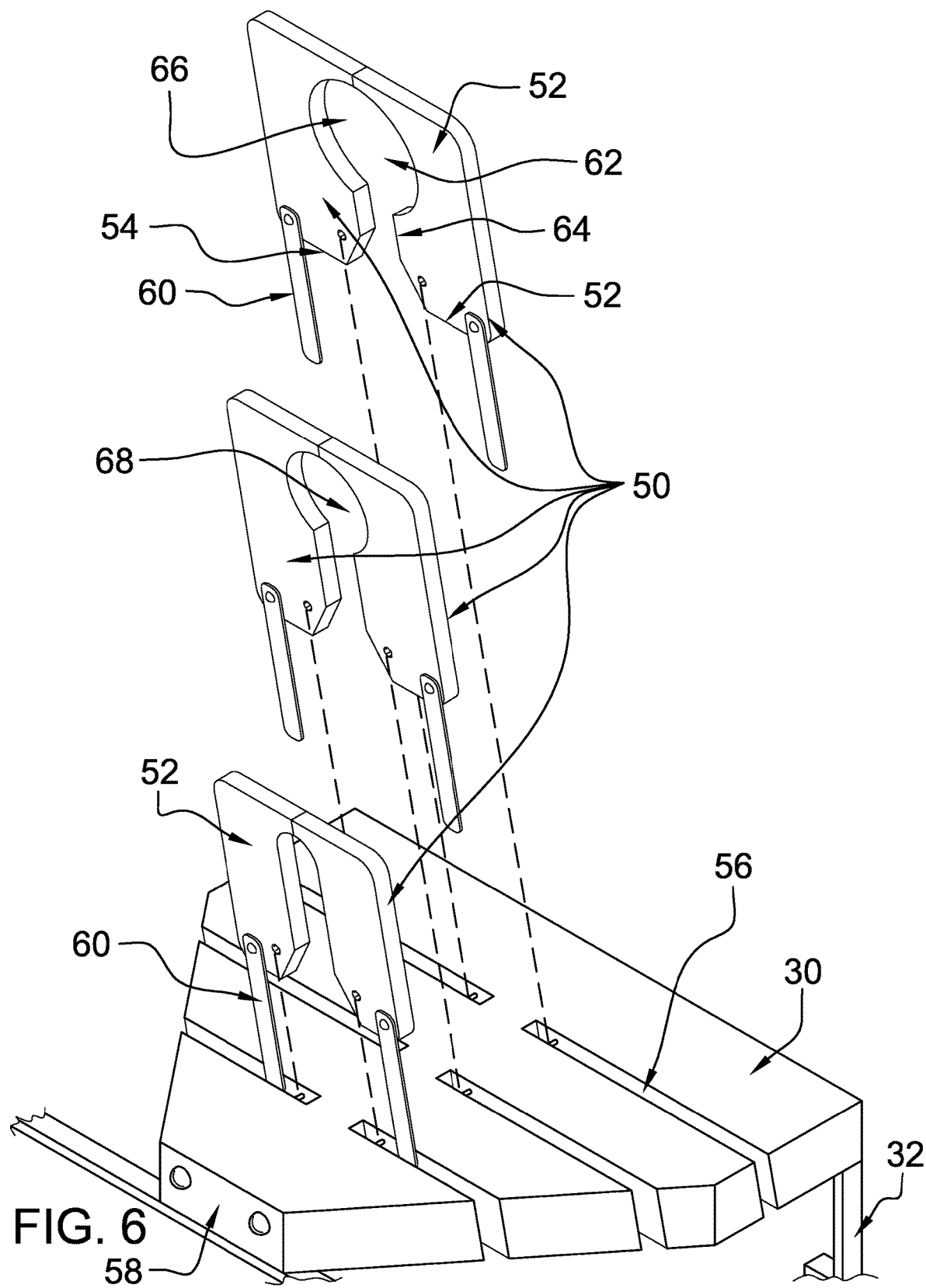
FIG. 6 is an exploded view of an embodiment of the disclosure.
Figure 7:
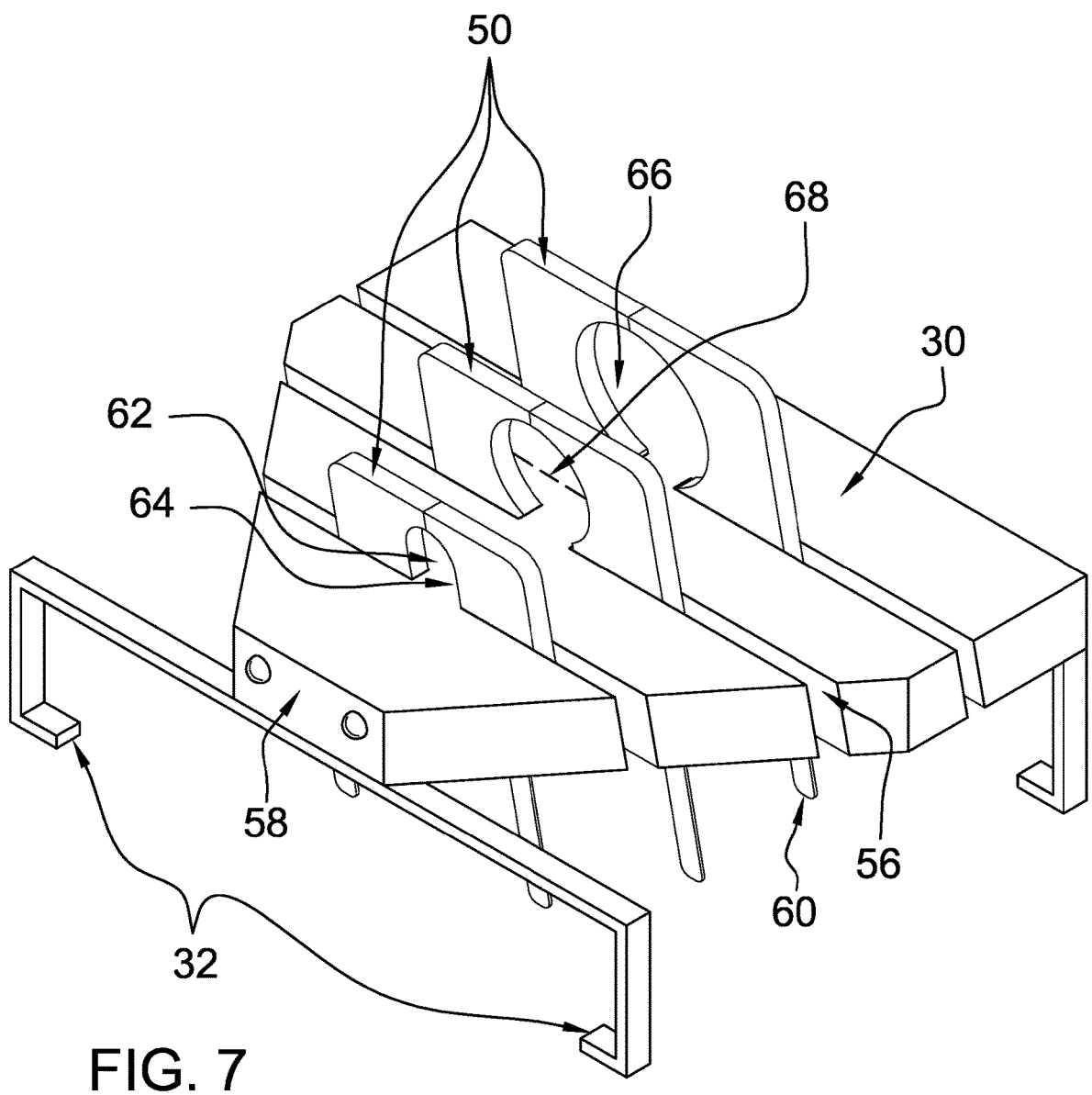
FIG. 7 is a detail isometric perspective view of an embodiment of the disclosure.
Figure 8:
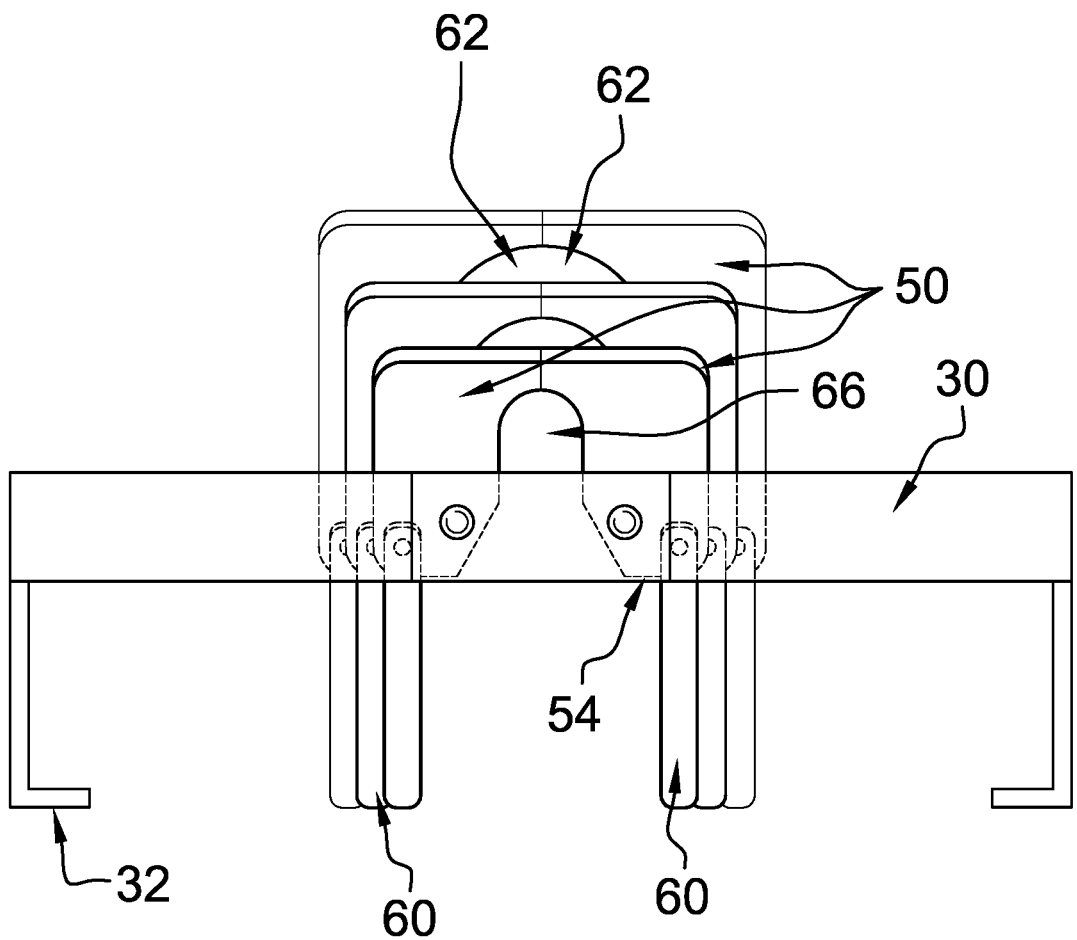
FIG. 8 is a detail end view of an embodiment of the disclosure.

A cutout 62 extends into an inner edge 64 of the panel 52. The plurality of forming units 50 comprises forming units 50 positioned in pairs of forming units 50, with the forming units 50 of each pair forming units 50 bracketing the centerline 36 of the sheet 34. Each pair of forming units 50 defines a substantially circular profile 66 of a respective diameter 68 so that the plurality of forming units 50 defines substantially circular profiles 66 a variety of diameters 68. The plurality of forming units 50 may comprise three pairs of forming units 50 which define substantially circular profiles 66 into which an imaginary cone would fit, as shown in FIG. 5.

A heating unit 70 substantially encompasses a section 72 of the conveyor 12 between the first end 40 and a second end 74 of the conveyor 12. The heating unit 70 comprises a box 76 and a heating element 78. The box 76 is engaged to the frame 16 and is positioned around the section 72 of the conveyor 12. The box 76 is open ended. The heating element 78 is configured to heat an interior space 80 defined by the box 76.

A guide 82 is engaged to the conveyor 12 within the heating unit 70 and is positioned to selectively engage the forming units 50 as the platform 30 traverses the heating unit 70. The guide 82 comprises a pair of tracks 84, with each track 84 being configured to engage a respective tang 60 as the platform 30 enters the heating unit 70 so that the panel 52 is motivated from the default position, wherein the panel 52 is substantially within the slot 56, to an extended positioned wherein the panel 52 contacts the sheet 34.

Each track 84 comprises a first segment 86, a second segment 88, a third segment 90, and a fourth segment 92. The first segment 86 is positioned to engage the respective tang 60 as the platform 30 enters the heating unit 70. The second segment 88 extends transversely from the first segment 86 so that the tang 60 motivates the panel 52 to the extended configuration, wherein the sheet 34 assumes a conical shape to mold the batter into the cone. The third segment 90 is engaged to the second segment 88 and extends in parallel with the belts 14 so that the tang 60 retains the panel 52 in the extended configuration as the platform 30 traverses the heating unit 70. The fourth segment 92 extends transversely from the third segment 90 so that the tang 60 motivates the panel 52 to the default configuration as the platform 30 exits the heating unit 70 to release the cone.

A vibrator 94 is engaged to the conveyor 12 between the heating unit 70 and the second end 74 of the conveyor 12. The vibrator 94 is operationally engaged to the pair of belts 14 and is positioned to vibrate the platform 30. The vibrator 94 thus is configured to loosen the cone from the sheet 34.

The forming units 50 are configured to mold the batter into a cone as the heating unit 70 bakes the batter and to release the cone as the platform 30 exits the heating unit 70. The cone drops from the platform 30 as the platform 30 rounds the second end 74 of the conveyor 12. The cone dropping from the platform 30 would be gently received by the next piece of equipment in a cone manufacturing process (not shown), such as a conveyance of a cooling station. The present invention anticipates one or more sprayers (not shown) engaged to the conveyor 12 and being configured to selectively spray the cylinder 48, the sheet 34, and the batter with one or more of a sweetener, a flavoring agent, an edible oil, and the like. The platform 30 is one of a plurality of platforms 30 so that a multitude of cones can be produced sequentially using the edible cone manufacturing assembly 10.

In use, the hopper 38 is charged with batter, which then is dispensed onto the sheet 34. The batter on the sheet 34 then is leveled by the cylinder 48. As the platform 30 enters the heating unit 70, the forming units 50 mold the batter into a conical shape as the heating unit 70 bakes the batter. The forming units 50 release the cone as the platform 30 exits the heating unit 70 and the vibrator 94 shakes the cone loose from the sheet 34. The cone drops from the platform 30 as the platform 30 rounds the second end 74 of the conveyor 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An edible cone manufacturing assembly:
    a conveyor comprising a pair of belts;
    a platform engaged to and extending between the belts, such that the platform rotates concurrently with the belts;
    a sheet having a centerline engaged to the platform, the sheet being resiliently flexible;
    a hopper engaged to the conveyor proximate to a first end of the conveyor, such that the hopper is stationary relative to the belts, the hopper being configured for containing a batter and for portioning the batter onto the sheet as the platform passes under the hopper;
    a plurality of forming units rotationally engaged to the platform;
    wherein each forming unit comprises:
        a panel having a first edge rotationally engaged to the platform and having a default position wherein the panel is substantially positioned in an associated slot positioned in the platform,
        a cutout extending into an inner edge of the panel, and
        a tang operationally engaged to the panel proximate to the first edge, such that the tang extends from the panel through the slot;
    the plurality of forming units comprising forming units positioned in pairs of forming units, the forming units of each pair forming units bracketing the centerline of the sheet;
    a heating unit substantially encompassing a section of the conveyor between the first end and a second end of the conveyor;
    a guide engaged to the conveyor within the heating unit and being positioned for selectively engaging the forming units as the platform traverses the heating unit, wherein the forming units are configured for molding the batter into a cone as the heating unit bakes the batter and for releasing the cone as the platform exits the heating unit, such that the cone drops from the platform as the platform rounds the second end of the conveyor; and
    the platform being one of a plurality of platforms.

2. The edible cone manufacturing assembly of claim 1, wherein the conveyor comprises:
    a frame comprising a pair of siderails and a pair of end rails, such that the frame is elongated rectangularly shaped;
    a plurality of arms engaged to and extending upwardly from the siderails;
    a pair of end rollers, each end roller being engaged to and extending between a pair of arms engaged singly to the siderails and positioned proximate to a respective end rail, such that the end roller is rotationally engaged to the pair of belts;
    a plurality of medial rollers, each medial roller being engaged to a respective arm, such that the medial roller is rotationally engaged to an associated belt; and
    a motor operationally engaged to a respective end roller, such that the motor is positioned for selectively rotating the respective end roller for rotating the pair of belts.

3. The edible cone manufacturing assembly of claim 1, wherein:
    the guide comprising a pair of tracks, each track being configured for engaging a respective tang as the platform enters the heating unit, such that the panel is motivated from a default position, wherein the panel is substantially within the slot, to an extended positioned, wherein the panel contacts the sheet.

4. The edible cone manufacturing assembly of claim 3, wherein the slot is angled within the platform, such that the panel is tilted toward a forward edge of the platform when the panel is in an extended configuration.

5. The edible cone manufacturing assembly of claim 3, further including:
    the sheet being substantially triangularly shaped;
    a rim engaged to and extending substantially perpendicularly from a perimeter of the sheet, wherein the rim is configured for retaining the batter on the sheet;
    the cutouts of each pair of forming units define a substantially circular profile when the panels are rotated to the extended position; and
    each pair of forming units defines a substantially circular profile of a respective diameter, such that the plurality of forming units defines substantially circular profiles a variety of diameters.

6. The edible cone manufacturing assembly of claim 5, wherein the plurality of forming units comprises three pairs of forming units defining substantially circular profiles into which an imaginary cone would fit.

7. The edible cone manufacturing assembly of claim 3, wherein each track comprises:
    a first segment positioned for engaging the respective tang as the platform enters the heating unit;
    a second segment extending transversely from the first segment, such that the tang motivates the panel to the extended configuration, such that the sheet assumes a conical shape for molding the batter into the cone;
    a third segment engaged to the second segment and extending in parallel with the belts, such that the tang retains the panel in the extended configuration as the platform traverses the heating unit; and
    a fourth segment extending transversely from the third segment, such that the tang motivates the panel to the default configuration as the platform exits the heating unit.

8. The edible cone manufacturing assembly of claim 1, further including a set of legs engaged to and positioned between the platform and the belts, such that the platform is offset from the belts.

9. The edible cone manufacturing assembly of claim 1, wherein the heating unit comprises:
   a box engaged to the frame and positioned around the section of the conveyor, the box being open ended; and
   a heating element configured for heating an interior space defined by the box.

10. The edible cone manufacturing assembly of claim 1, further including a vibrator engaged to the conveyor between the heating unit and the second end of the conveyor, the vibrator being operationally engaged to the pair of belts, such that the vibrator is positioned for vibrating the platform, wherein the vibrator is configured for loosening the cone from the sheet.

11. The edible cone manufacturing assembly of claim 1, further including a valve operationally engaged to the hopper, such that the valve is positioned for selectively and quantitatively dispensing the batter from the hopper onto the sheet.

12. The edible cone manufacturing assembly of claim 11, further including a sensor engaged to the hopper proximate to the valve, the sensor being operationally engaged to the valve, the sensor being configured for assessing a position of the sheet, such that the sensor is positioned for signaling the valve when the sheet is positioned for receiving the batter.

13. The edible cone manufacturing assembly of claim 12, wherein the sensor comprises a laser.

14. The edible cone manufacturing assembly of claim 5, further including a cylinder rotationally engaged to the conveyor proximate to the hopper, wherein the cylinder is configured for leveling the batter on the sheet as the platform passes under the cylinder with the cylinder rolling over the rim.

15. An edible cone manufacturing assembly:
   a conveyor comprising a pair of belts, the conveyor comprising:
      a frame comprising a pair of siderails and a pair of end rails, such that the frame is elongated rectangularly shaped,
      a plurality of arms engaged to and extending upwardly from the siderails,
      a pair of end rollers, each end roller being engaged to and extending between a pair of arms engaged singly to the siderails and positioned proximate to a respective end rail, such that the end roller is rotationally engaged to the pair of belts,
      a plurality of medial rollers, each medial roller being engaged to a respective arm, such that the medial roller is rotationally engaged to an associated belt, and
      a motor operationally engaged to a respective end roller, such that the motor is positioned for selectively rotating the respective end roller for rotating the pair of belts;
   a platform engaged to and extending between the belts, such that the platform rotates concurrently with the belts;
   a sheet having a centerline engaged to the platform, the sheet being resiliently flexible, the sheet being substantially triangularly shaped;
   a hopper engaged to the conveyor proximate to a first end of the conveyor, such that the hopper is stationary relative to the belts, the hopper being configured for containing a batter and for portioning the batter onto the sheet as the platform passes under the hopper;
   a rim engaged to and extending substantially perpendicularly from a perimeter of the sheet, wherein the rim is configured for retaining the batter on the sheet;
   a plurality of forming units rotationally engaged to the platform, each forming unit comprising:
      a panel having a first edge rotationally engaged to the platform and having a default position wherein the panel is substantially positioned in an associated slot positioned in the platform, the slot being angled within the platform, such that the panel is tilted toward a forward edge of the platform when the panel is in an extended configuration,
      a cutout extending into an inner edge of the panel, and
      a tang operationally engaged to the panel proximate to the first edge, such that the tang extends from the panel through the slot;
   the plurality of forming units comprising forming units positioned in pairs of forming units, the forming units of each pair forming units bracketing the centerline of the sheet, the cutouts of each pair of forming units define a substantially circular profile when the panels are rotated to the extended position, each pair of forming units defining a substantially circular profile of a respective diameter, such that the plurality of forming units defines substantially circular profiles a variety of diameters, the plurality of forming units comprising three pairs of forming units defining substantially circular profiles into which an imaginary cone would fit;
   a set of legs engaged to and positioned between the platform and the belts, such that the platform is offset from the belts;
   a heating unit substantially encompassing a section of the conveyor between the first end and a second end of the conveyor, the heating unit comprising:
      a box engaged to the frame and positioned around the section of the conveyor, the box being open ended, and
      a heating element configured for heating an interior space defined by the box;
   a guide engaged to the conveyor within the heating unit and being positioned for selectively engaging the forming units as the platform traverses the heating unit, wherein the forming units are configured for molding the batter into a cone as the heating unit bakes the batter and for releasing the cone as the platform exits the heating unit, such that the cone drops from the platform as the platform rounds the second end of the conveyor, the guide comprising a pair of tracks, each track being configured for engaging a respective tang as the platform enters the heating unit, such that the panel is motivated from a default position, wherein the panel is substantially within the slot, to an extended positioned, wherein the panel contacts the sheet, each track comprising:
      a first segment positioned for engaging the respective tang as the platform enters the heating unit,
      a second segment extending transversely from the first segment, such that the tang motivates the panel to the extended configuration, such that the sheet assumes a conical shape for molding the batter into the cone,
      a third segment engaged to the second segment and extending in parallel with the belts, such that the tang retains the panel in the extended configuration as the platform traverses the heating unit, and
      a fourth segment extending transversely from the third segment, such that the tang motivates the panel to the default configuration as the platform exits the heating unit;
   the platform being one of a plurality of platforms;

a vibrator engaged to the conveyor between the heating unit and the second end of the conveyor, the vibrator being operationally engaged to the pair of belts, such that the vibrator is positioned for vibrating the platform, wherein the vibrator is configured for loosening the cone from the sheet;

a valve operationally engaged to the hopper such that the valve is positioned for selectively and quantitatively dispensing the batter from the hopper onto the sheet;

a sensor engaged to the hopper proximate to the valve, the sensor being operationally engaged to the valve, the sensor being configured for assessing a position of the sheet, such that the sensor is positioned for signaling the valve when the sheet is positioned for receiving the batter, the sensor comprising a laser; and a cylinder rotationally engaged to the conveyor proximate to the hopper, wherein the cylinder is configured for leveling the batter on the sheet as the platform passes under the cylinder with the cylinder rolling over the rim.

* * * * *